United States Patent Office 2,994,077
Patented July 25, 1961

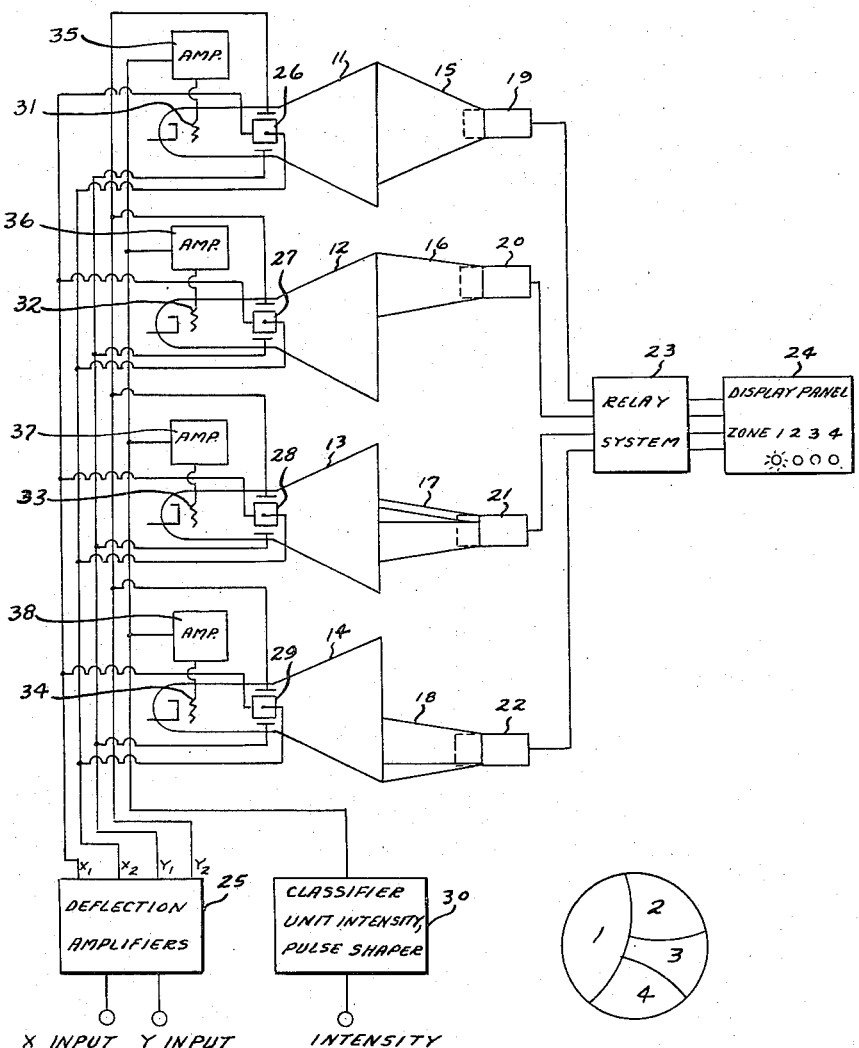

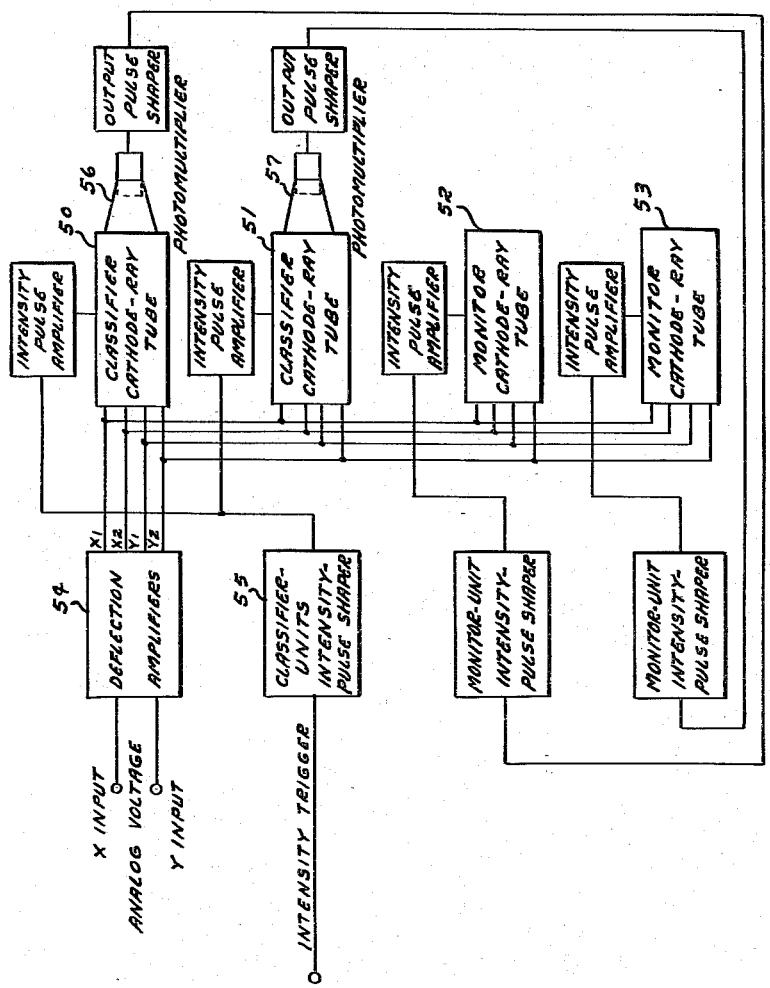

2,994,077
RADAR TARGET POSITION CLASSIFIER
Robert W. Terhune, Ypsilanti, Mich., assignor to the United States of America as represented by the Secretary of the Air Force
Filed Apr. 29, 1957, Ser. No. 655,926
1 Claim. (Cl. 340—366)

This invention relates to a two-coordinate position classifier which determines which of several areas contains a given target.

An object of the invention is to provide a device to determine, in a few microseconds, the area in which a particular target appears.

Another object is to provide a device to classify targets according to the area in which they appear and to indicate either the area in which they appear or the number of targets that appear in any particular area.

In the organization of the ground equipment for an air defense system, the geographical area covered by one defense sector is set primarily by the operating ranges of the weapons available for defensive action. The division of each sector into subsectors of surveillance responsibility is necessitated by the more limited ranges of the system's search radars. Whenever a target crosses a boundary between two subsectors, it is necessary to invoke special procedures to ensure that the target is tracked continuously by one or more radars while also ensuring that the system's information store receives unambiguous data on the target without confusion by redundancy of sources.

The sector's command post must therefore choose one search radar site from which to accept data on each target and also appropriate search radar sites to which stored target data and suitable tracking data must be sent. There is thus a need for automatic equipment capable of performing rapid correlations of reported aircraft positions with the areas in which they appear. These areas, though well-defined may be irregularly shaped.

The basic unit of the position classifier consists of a cathode ray tube with electrostatic deflection means, a phototube and a mask between the cathode ray tube and the phototube. The position classifier contains a number of such units, for example, one classifier may have as many as 30 units with the difference in the units residing only in the particular mask which makes each unit sensitive to a different area. Target information which is stored in digital form in the information store must be converted to analog voltages before it is applied to the position classifiers. The target information is simultaneously applied to all of the cathode ray tubes whereas only one phototube will produce an output for each target. The outputs of the phototubes are fed to a utilization device such as a display panel, a counter, or it may be used to govern some automatic equipment for selecting the particular search radar site from which target data is accepted and to which the stored target data or tracking information is sent.

The target position classifier needs, as inputs, only a pair of analog position voltages per target together with an associated timing pulse capable of triggering the intensity circuitry of the classifier cathode ray tubes. The particular nature of the source from which these voltages are obtained has no effect upon the operation of the target position classifier. The analog position voltages may have a value anywhere between +60 volts and −60 volts and should be accurate and constant for at least 5 microseconds within the period extending from 5 microseconds to about 40 microseconds after the leading edge of the intensity trigger pulse. If a direct current level shifting adapter is used, it is obvious that these voltages could be different from these values, for example, between +260 volts and +140 volts. The intensity trigger should be either a pulse of +30 volts peak and one-microsecond length or some other pulse form of that amplitude; a short rise time is not necessary for triggering action, but does serve to reduce output pulse jitter. Since the value of the target position classifier depends principally upon its speed of operation, its worthwhile field of application consists of those cases where the inputs relating to one position can persist only for the time on the order of 5 to 50 microseconds, which is the operating time required by the classifier. Durations of this magnitude are not demanded unless new positions are presented to the classifier at intervals of the same magnitude. In general, this occurs only when the data to be classified are available in a high-speed sequence, as when reading out of some form of signal recording device, or information stored. Analog and digital storage units require different amounts of equipment to provide successive pairs of analog voltages. If an analog voltage store is used, the readout equipment could consist of switching apparatus which connects a succession of different pairs of stored coordinate voltages to the classifier input lines. No additional equipment is then required in order to provide classifier inputs. If a digital store is used, some type of digital-to-analog converter is necessary. A converter consisting of a resistive matrix switched by relays, which are, in turn, driven by vacuum tube counter and driven stages, would produce very accurate analog outputs, but would have an operating time of several milliseconds per target. Two converters, each consisting of about eight relays, 25 precision resistors, and 20 vacuum tube stages could be used to produce suitably accurate voltages, if their operating speeds were sufficient for the application. Electronic digital-to-analog converters which give output voltages accurate to 8 bits and make one conversion in less than five microseconds require only about 12 tubes per axis. In one system, the information in the combat center's main store is made available for internal use by first being read out into a temporary store. This temporary store includes electronic converters which develop the analog position voltages for all of the combat center consoles and, is thus able, with almost no additional equipment, to provide these voltages for the position classifiers as well. It also provides the timing signal which tells the classifier when to perform its function on each pair of position voltages. It has a storage time of 100 microseconds and an operating capacity of one target word, that is, all of the information which the main store possesses relating to one target. Thus it can, in 1/20 of a second, cyclically handle the main store's full capacity of 500 target words.

The outputs of the classifier are pulses whose essential characteristics are the same as those given above for the intensity trigger input. Each appears on a separate output line, there being as many parallel lines from any particular classifier as there are classes in the classifier. Essentially then the target classifier acts to separate the intensity trigger pulses according to the sectors in which the targets appear. The manner in which the output signals are used is more dependent upon the results desired than it is upon any nature of the classifier.

The above and other objects and features will become apparent from the following description in connection with the accompanying drawing, wherein:

FIG. 1 is a circuit schematic partly in block form of a position classifier wherein the outputs of the classifier units are displayed on a display panel.

FIG. 2 shows a possible division of the tube face area for the different masks for the device of FIG. 1.

FIG. 4 is a block diagram of a position classifier wherein the outputs of the classifier units are used to control two monitor display tubes.

Figure 3:
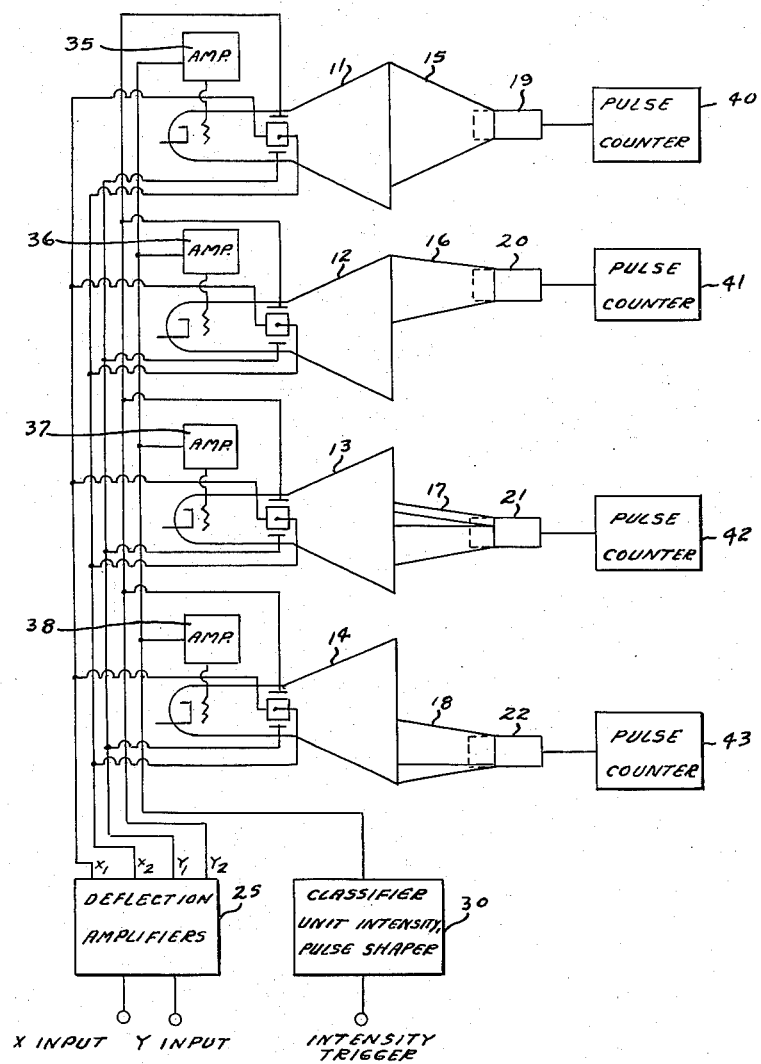
FIG. 3 shows a device similar to that of FIG. 1 wherein the outputs of the classifier units are fed to a pulse counter.

Referring now more particularly to FIG. 1, the reference numerals 11, 12, 13 and 14 refer to four classifier cathode ray tubes with masks 15, 16, 17 and 18 applied to different areas of the face of the tubes, as shown in FIG. 2, to permit light only from those areas to reach phototubes 19, 20, 21 and 22, respectively, which may be photomultipliers. For example, mask 15 will allow light from only area 1 to reach phototube 19, mask 16 will allow light from only area 2 to reach phototube 20, etc. The outputs of the phototubes are applied to a relay system 23 which controls the operation of the lights on a display panel 24. It is obvious that other types of masks than those shown could be used, for example, all but the desired area of the cathode ray tube screen could be covered with a mask.

Target information is stored in digital form in the information store so it must be converted to analog voltages. The deflection data is applied to deflection amplifier circuit 25 and then to electrostatic deflection means 26, 27, 28 and 29 of tubes 11, 12, 13 and 14, respectively. An intensity trigger from the information store is applied to a pulse shaper 30 and then to grids 31, 32, 33 and 34 through amplifiers 35, 36, 37 and 38, respectively.

A replica of the target's position will appear simultaneously as a luminous spot on all of the cathode ray tubes. Due to the masks, however, only one phototube will produce an output which will produce a corresponding display on the display panel thereby indicating the area in which the target appears.

The device of FIG. 3 is identical in all respects to the device of FIG. 1 except that the outputs of the phototubes 19, 20, 21 and 22 are made to control pulse counters 40, 41, 42 and 43 which indicate the number of targets appearing in each area.

FIG. 4 shows two classifier units 50 and 51 which are used to control two monitor units 52 and 53. The output of the deflection amplifier 54 is applied to both the classifier units and the monitor units whereas the intensity signal from shaper 55 is applied only to the classifier units. The outputs of the phototubes associated with classifier units 50 and 51 are applied through appropriate shaper and amplifier circuits to the control grid of the monitor cathode ray tubes 52 and 53. Only targets appearing in the area covered by mask 56 will appear on monitor tube 52 whereas targets appearing within the area covered by mask 57 will appear on monitor tube 53.

There is thus provided a device for rapidly determining the particular area in which a target appears.

While all of the embodiments described have a plurality of classifier units, it is obvious that a single unit could be used if only target information for one area is desired.

Also it is to be understood that numerous other changes may be made without departing from the general principles and scope of the invention.

What is claimed is:

A device for classifying the targets in a defense sector of an air defense system according to the subsector of surveillance in which they appear, comprising: a plurality of classifier cathode ray tubes, each having an intensity control electrode and horizontal and vertical deflection means, with one tube corresponding to each of said subsectors; a plurality of monitor cathode ray tubes, each having an intensity control electrode and horizontal and vertical deflection means; means for supplying horizontal and vertical target information, corresponding to all of the geographical area covered by said defense sector, to the horizontal and vertical deflection means respectively of all of said tubes simultaneously; means for applying a target intensity signal to all of said classifier cathode ray tubes; a light sensitive means adjacent each of said classifier cathode ray tubes; means located between each light sensitive means and its corresponding cathode ray tube for masking the light sensitive means from all areas of the faces of said cathode ray tubes except the area corresponding one subsector of surveillance with all of the areas of the defense sector having a cathode ray tube, mask and light sensitive means corresponding thereto; and means for applying the output of each of said light sensitive means to the intensity control electrode of a separate one of said monitor cathode ray tubes whereby said monitor cathode ray tubes display only the targets within one subsector of surveillance.

References Cited in the file of this patent

UNITED STATES PATENTS

| | | |
|---|---|---|
| 2,412,669 | Bedford | Dec. 17, 1946 |
| 2,534,369 | Ress | Dec. 19, 1950 |
| 2,636,166 | Herbst | Apr. 21, 1953 |
| 2,668,286 | White | Feb. 2, 1954 |
| 2,721,900 | Oliver | Oct. 25, 1955 |
| 2,830,113 | Levine | Apr. 8, 1958 |

OTHER REFERENCES

Forgue: "The Storage Orthicon and its Application to Teleran," R.C.A. Review, vol. VIII, No. 4, pages 637–639, December 1947.